United States Patent [19]

Tappe et al.

[11] Patent Number: 4,620,853
[45] Date of Patent: Nov. 4, 1986

[54] DYESTUFF MIXTURES, PROCESS FOR THEIR PREPARATION AND PROCESS FOR DYEING AND PRINTING HYDROPHOBIC FIBER MATERIALS

[75] Inventors: Horst Tappe, Dietzenbach; Klaus Hofmann, Frankfurt am Main; Manfred Hähnke, Kelkheim; Albert Bode, Schwalbach, all of Fed. Rep. of Germany

[73] Assignee: Cassella Aktiengesellschaft, Frankfurt am Main, Fed. Rep. of Germany

[21] Appl. No.: 806,448

[22] Filed: Dec. 9, 1985

[30] Foreign Application Priority Data

Dec. 17, 1984 [DE] Fed. Rep. of Germany ....... 3445930

[51] Int. Cl.$^4$ .................. C09B 67/22; C09B 29/15
[52] U.S. Cl. .................................. 8/639; 8/695; 8/696; 534/841
[58] Field of Search ............................................. 8/639

[56] References Cited

FOREIGN PATENT DOCUMENTS 884655 12/1961 United Kingdom .
917611 2/1963 United Kingdom .
1063155 3/1967 United Kingdom .

*Primary Examiner*—A. Lionel Clingman
*Attorney, Agent, or Firm*—Connolly and Hutz

[57] ABSTRACT

Dyestuff mixtures which contain dyestuffs (A) of the formula

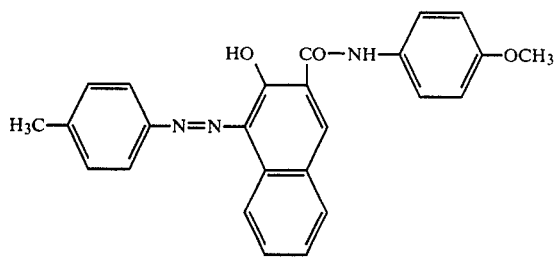

and dyestuff (B) of the formula

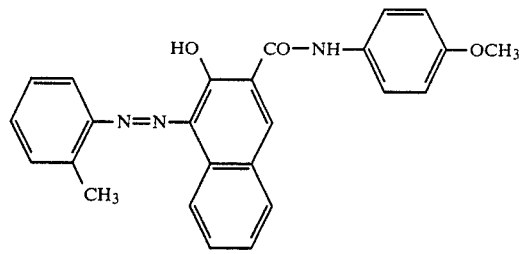

in an (A):(B) weight ratio of (80 to 60):(20 to 40) useful for dyeing and printing hydrophobic fiber materials.

8 Claims, No Drawings

DYESTUFF MIXTURES, PROCESS FOR THEIR PREPARATION AND PROCESS FOR DYEING AND PRINTING HYDROPHOBIC FIBER MATERIALS

German Pat. No. 1,285,443 (corresponding to British Pat. No. 1,063,155) discloses a process for dyeing and printing fibre material made of high-molecular polyesters which makes use of the dyestuff of the formula I

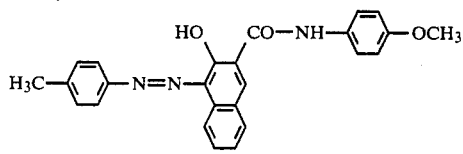

This dyestuff produces on polyester materials deep scarlet-coloured dyeings and prints having good fastness properties.

It has now been found, surprisingly, that it is possible to improve the coloristic properties of the dyestuff, in particular its affinity and build-up, a great deal further if it is used for dyeing and printing hydrophobic fibre material in a mixture with the dyestuff of the formula II

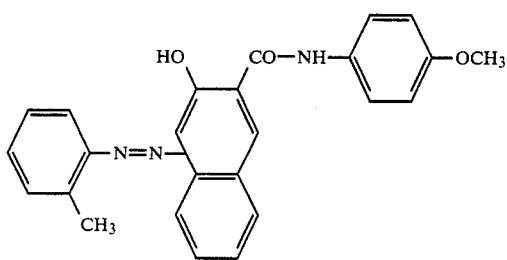

In the dyestuff mixtures according to the invention, the weight ratio between said dyestuffs I and II is (80 to 60):(20 to 40). The weight ratio of dyestuffs I:II is preferably 70:30.

The dyestuff mixtures according to the invention are used for dyeing and printing hydrophobic fibre materials.

The dyestuff mixtures according to the invention contain or consist of the two dyestuffs I and II. The abovementioned weight ratios merely relate to that portion of the dyestuff mixtures according to the invention which consists of the dyestuffs I and II. In addition the dyestuff mixtures according to the invention can also contain standardising agents and/or auxiliaries and if desired other dyestuffs as well.

The dyestuff mixtures according to the invention can be present in powder form or paste form. The dyestuff preparations in powder form normally have a dyestuff content of 30 to 50% by weight. The rest consists of standardising agents and/or auxiliaries, such as, for example, dispersants, wetting agents, emulsifiers, dedusting agents and the like. The dyestuff preparations in paste form which are present in aqueous suspension normally have a dyestuff content of 20 to 50% by weight and a standardising agent and/or auxiliary content of 20 to 30% by weight, the remainder being water. The auxiliaries in the dyestuff preparations in paste form can be in addition to dispersants, emulsifiers and wetting agents also drying retardents, such as, for example, glycols or glycerol, and preservatives or fungicides.

The dyestuff mixtures according to the invention can be prepared by various methods, for example by mixing previously finished individual dyestuffs I and II or by mixing of unfinished individual dyestuffs I and II and finishing subsequent to or during the mixing. The mixing of unfinished individual dyestuffs I and II is preferably carried out in the presence of dispersants and if desired further auxiliaries. This mixing is advantageously carried out in conjunction with the wet comminution at temperatures of from 0° to 190° C. which is carried out as part of the finishing of disperse dyestuffs, advantageously in suitable mills, for example colloid, ball, bead or sand mills, or dispersion kneaders, but it can also be carried out in particular with previously finished individual dyestuffs I and II by mixing by hand or by stirring into dispersants or dyeing liquors or by incorporation into print pastes.

In the wet comminution of dyestuffs, the dyestuffs are slurried together with dispersants in a liquid medium, preferably water, and the mixture is exposed to the action of shear forces. In the course of this exposure, the originally present dyestuff particles are mechanically reduced in size until an optimal specific surface area has been reached and the sedimentation of the dyestuffs is as low as possible. The particle size of the dyestuffs is generally about 0.1 to 10 μm.

The dispersants which are present in the wet comminution can be non-ionic or anionic. Examples of non-ionic dispersants are reaction products of alkylene oxides, such as, for example, ethylene oxide or propylene oxide, with alkylatable compounds, such as, for example, fatty alcohols, fatty acids, phenols, alkylphenols and carboxamides. Examples of anionic dispersants are ligninsulphonates, alkylsulphonates, alkylarylsulphonates and alkylaryl polyglycol ether sulphates.

The dyestuff dispersions obtained in the wet comminution should be pourable for most applications and can also contain further auxiliaries, for example those which act as oxidising agents, such as, for example, sodium m-nitrobenzenesulphonate, or fungicidal agents, such as, for example, sodium o-phenylphenolate and sodium pentachlorophenolate.

The dyestuff dispersions thus obtained can be very advantageously used for making up print pastes and dyeing liquors. They offer particular advantages, for example in the case of the continuous processes, in which the dyestuff concentration of the dyeing liquors needs to be kept constant through continuous dyestuff feed into the running apparatus.

In certain areas of application, powder formulations are preferred. These powders contain the dyestuff, dispersant and other auxiliaries, such as, for example, wetting agents, oxidising agents, preservatives and dedusting agents.

A method for preparing pulverulent dyestuff preparations consists in stripping the liquid dyestuff dispersions described above of the liquid, for example by vacuum drying, freeze-drying, drying on drum dryers, but preferably by spray-drying.

If the dyestuffs are to be used for textile printing, the required amounts of the dyestuff formulations are kneaded together with thickening agents, such as, for example, alkali metal alginates or the like, and if desired further additives, such as fixation accelerators, wetting agents and oxidising agents, to give print pastes.

The dyestuff mixtures according to the invention are preferably prepared by diazotising a mixture of p-toluidine and o-toluidine in a weight ratio of (80 to 60):(20 to 40), preferably 70:30, in a manner known per se and subsequently coupling onto the coupling component 3-hydroxy-2-naphthoic acid-p-anisidide of the formula III

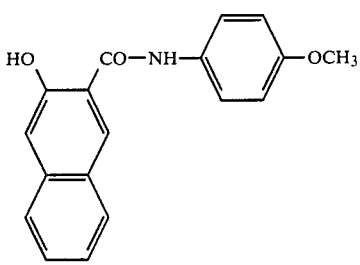

The dyestuff mixture obtained is isolated in a manner known per se and converted into a dyestuff preparation in powder or paste form.

The mixture of p- and o-toluidine is diazotised in a manner known per se, namely at temperatures of from 0° to 40° C. in an acid aqueous medium, a lower alkanoic acid, such as, for example, formic acid, acetic acid or propionic acid, or mixtures thereof, or in an organic solvent through the action of nitrous acid or other systems forming nitrosonium ions.

The coupling is likewise effected in a manner known per se, namely at temperatures of from 0° to 40° C., preferably 0° to 25° C., in a suitable solvent, such as, for example, an alkanol of 1 to 4 C atoms, dimethylformamide, preferably in water rendered alkaline with hydroxide solution or in the presence or absence of an alkanol of limited miscibility with water by combining the diazo solution obtained with a solution of coupling component III. The coupling is complete after some hours, and the mixture of the dyestuffs of the formula I and II can be isolated in a conventional manner, dried and be converted in the abovementioned manner into a preparation in powder or paste form.

The invdividual dyestuff of the formula II has evidently not yet been described in the literature. It can be easily prepared by diazotisation of o-toluidine and subsequent coupling onto 3-hydroxy-2-naphthoic acid-p-anisidide of the formula III in analogous manner to that known for preparing the individual dyestuff of the formula I or as described above for the preparation of the mixture consisting of the individual dyestuffs of the formulae I and II.

The dyestuff mixtures according to the invention are highly suitable for dyeing and printing hydrophobic synthetic fibre materials in vivid scarlet shades. Surprisingly, especially the preferred dyestuff mixtures according to the invention are superior to the individual dyestuff known from German Pat. No. 1,285,443 in terms of dyeing properties and coloristic fastness properties. The dyestuff mixtures according to the invention have excellent levelling properties and excellent build-up and exhaustion properties, and the dyeings and prints prepared therewith have, for example, a good light fastness, sublimation fastness, dry heat setting and pleating fastness, good wetfastness properties, such as, for example, water, perspiration and wash fastness. The dyeings and prints prepared with the dyestuff mixtures according to the invention also have a good pH stability, a high colour brilliance and high purity. Moreover, the dyestuff mixtures according to the invention produce very deep dyeings with excellent bath exhaustion even if the dyeing temperatures are lowered. The dyestuff mixtures according to the invention are also highly suitable for preparing combination shades together with other dyestuffs.

Examples of suitable hydrophobic synthetic materials are: cellulose-2½-acetate, cellulose triacetate, polyamides and especially high-molecular polyesters, such as, for example, polyethylene glycol terephthalate, and their mixtures with natural fibre substances, such as, for example, cotton, regenerated cellulose fibres or wool.

To prepare the dyeing liquors, the required amounts of the dyestuff formulations are diluted with the dyeing medium, preferably water, to such an extent that a liquor ratio of 5:1 to 50:1 results for the dyeing. In addition, further dyeing auxiliaries, such as dispersing, wetting and fixing auxiliaries, are generally added to the liquors.

The dyestuff mixtures according to the invention are preferably used for the dyeing and printing of materials made of high molecular polyesters, in particular those based on polyethylene glycol terephthalates or their mixtures with natural fibre materials or of materials made of cellulose triacetate. These materials can be present for example in the form of sheetlike, fibrelike or threadlike structures and have been processed for example into yarns or woven or knitted fabrics. The dyeing of the stated fibre material with the dyestuff mixtures according to the invention is effected in a manner known per se, preferably from an aqueous suspension, in the absence or presence of carriers, between 80° and about 125° C. by the exhaustion method, or in the absence of carriers by the HT method, namely at about 110° to 140° C. in a dyeing autoclave, as well as by the so-called thermofixing method, where the cloth is padded with the dyeing liquor and is then fixed at about 175° to 230° C. The printing of the stated materials can be carried out in such a way that the cloth printed with print pastes containing dyestuff mixtures according to the invention is treated at temperatures between about 110° and 230° C. with HT steam, compressed steam or dry heat in the absence or presence of a carrier, to fix the dyestuff. The results obtained in this way are very deep scarlet-coloured level dyeings and prints having very good fastness properties.

When dyeing with dyestuff mixtures according to the invention using the HT method it is possible to reduce the dyeing temperature compared to the dyeing with the individual dyestuffs known from German Offenlegungsschrift No. 1,285,443, for example from 130° C. to 120°–125° C., and still obtain as good or better coloristic effects. In addition, the bath exhaustion is also much better with the dyestuff mixtures according to the invention. It was also surprising that the dyestuff mixtures according to the invention have better build-up and exhaustion properties in dyeing by the carrier method.

If the textile materials to be dyed or printed contain aside from the stated hydrophobic synthetic fibres also natural fibres, in particular those mentioned above, the dyestuffs according to the invention and the dyestuff mixtures according to the invention can also be used together with other classes of dyestuff, such as, for example, vat, direct or reactive dyestuffs. After application the dyestuffs are then fixed simultaneously or consecutively in a manner known per se.

The following examples illustrate the preparation of the dyestuff mixtures according to the invention and techniques for their application. The percentages and parts are by weight.

EXAMPLE 1

7.5 g of p-toluidine and 3.2 g of o-toluidine are diazotised in 90 ml of water and 30 ml of concentrated hydrochloric acid with 14 ml of 40% strength sodium nitrite solution and 80 g of ice. After subsequent stirring for 1.5 hours the diazo solution is added to a solution of 30.8 g of 3-hydroxy-2-naphthoic acid-p-anisidide (III) in 36 ml of water and 47 ml of 27% strength sodium hydroxide solution in the course of 30 min. After subsequent stirring for one hour, pH 8.5 is set with about 22 ml of concentrated hydrochloric acid, which is followed by stirring at 60° C. for 1 h, hot filtration, washing and drying. The result obtained is 41 g of the following dyestuff mixture: 70% of

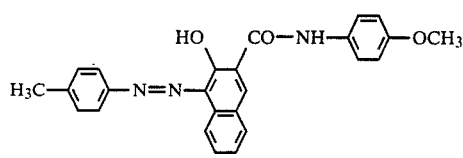

(I)

and 30% of

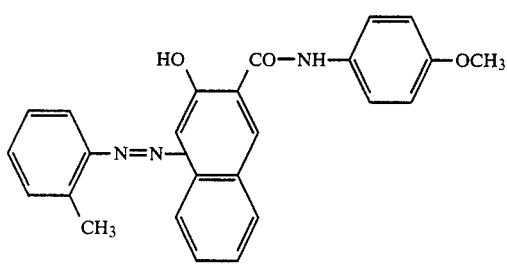

(II)

having a melting range of from 146° to 154° C.

EXAMPLE 2

If in Example 1 the 7.5 g of p-toluidine are replaced by 8.6 g of p-toluidine and the 3.2 g of o-toluidine are replaced by 2.1 g of o-toluidine, the result obtained is a dyestuff mixture which consists of 80% of dyestuff I and 20% of dyestuff II. The dyestuff mixture has a melting range of from 154° to 164° C.

EXAMPLE 3

If in Example 1 the 7.5 g of p-toluidine are replaced by 6.4 g of p-toluidine and the 3.2 g of o-toluidine are replaced by 4.3 g of o-toluidine, the result obtained is a dyestuff mixture which consists of 60% of dyestuff I and 40% of dyestuff II. The dyestuff mixture melts at around 164° C. without sharp melting point.

EXAMPLE 4

1.0 g of the dyestuff mixture obtained as described in Example 1 is finely dispersed in a bead mill in the presence of twice the amount of a commercially available dispersant from the ligninsulphonate series and is then stirred into 2,000 g of water. To the dispersion are added 4.0 g of ammonium sulphate and 2.0 g of a commercially available dispersant based on a naphthalenesulphonic acid/formaldehyde condensate, and a pH of 5 is set with acetic acid.

100 g of a polyester fabric based on polyethylene glycol terephthalate are introduced into the dyeing liquor thus obtained, and are dyed at 130° C. for 1 h.

Subsequent rinsing, reduction clearing with a 0.2% strength sodium dithionite solution, adjusted to pH 10–11 with sodium hydroxide solution, at 70° to 80° C. for 15 min, further rinsing and drying gives a bright strong scarlet-red dyeing having very good coloristic properties.

If the dyestuff mixture of Example 1 is replaced by the dyestuff mixtures of Examples 2 and 3, the results obtained are similar.

EXAMPLE 5

30 g of the dyestuff mixture obtained as described in Example 1 are incorporated in finely divided form into a print paste which contains per 1,000 g 45 g of carob bean flour, 6.0 g of sodium 3-nitrobenzenesulphonate and 3.0 g of citric acid. This print paste is used to obtain on a polyester fabric by printing, drying and fixing in a thermofixing frame at 215° C. for 45 sec, rinsing and finishing as described in Example 4, a strong scarlet-red print having very good coloristic properties, in particular very good light, dry heat pleating and dry heat setting properties.

If the dyestuff mixture of Example 1 is replaced by the dyestuff mixtures of Examples 2 and 3, the results obtained are similar.

EXAMPLE 6

A fabric made of polyethylene glycol terephthalate is padded at 30° C. on a pad-mangle with a liquor which contains 30 parts by weight of the dyestuff mixture obtained as described in Example 1 and brought into finely divided form, 1.0 g of a polyacrylamide having a K value of 120, 0.5 part by weight of a polyglycol ether of oleyl alcohol and 968.5 g of water. Drying is followed by fixing at 215° C. in a thermofixing frame for 60 sec. Subsequent rinsing and finishing as described in Example 4 gives a brilliant scarlet dyeing having very good fastness properties.

If the dyestuff mixture of Example 1 is replaced by the dyestuff mixtures of Examples 2 and 3, the results obtained are similar.

EXAMPLE 7

If in Example 1 the 7.5 g of p-toluidine and 3.2 g of o-toluidine are replaced by 10.7 g of o-toluidine, the result obtained is the dyestuff of the formula II having a melting point of 218° C.

By mixing this dyestuff with the dyestuff of the formula I in the required mixing ratio it is possible to prepare dyestuff mixtures according to the invention.

The dyestuff of the formula II, if applied to hydrophobic fibre materials by the customary dyeing and printing methods, produces scarlet-red dyeings and prints.

What is claimed is:

1. The mixture of monoazo dyestuffs which comprises dyestuffs (A) and dyestuff (B) wherein dyestuff (A) is of the formula

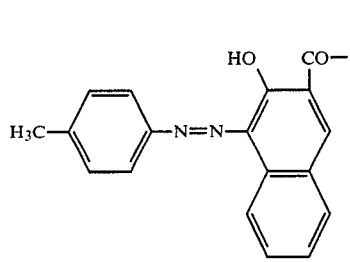

and dyestuff (B) is of the formula

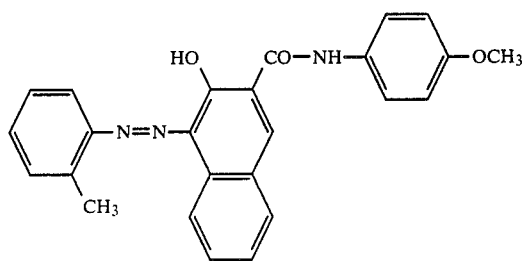

and wherein the weight ratio of dyestuff (A) to dyestuff (B) is about (80 to 60):(20 to 40).

2. The mixture of monoazo dyestuffs according to claim 1 wherein the weight ratio of dyestuff (A) to dyestuff (B) is about 70:30.

3. A process for preparing the dyestuff mixture according to claim 1 wherein dyestuff (a) of the formula

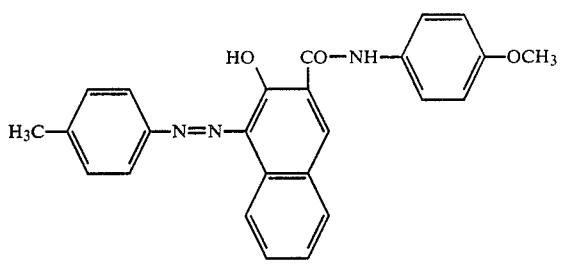

is mixed with dyestuff (b) of the formula

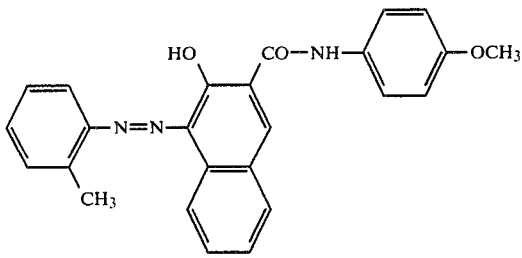

in a weight ratio of about (80 to 60):(20 to 40), in the absence or presence of standardizing agents, auxiliaries or further dyestuffs.

4. A process according to claim 3 wherein dyestuff (A) is mixed with dyestuff (B) in a weight ratio of about 70:30.

5. A process for preparing the dyestuff mixture according to claim 1 which comprises diazotizing p-toluidine and o-toluidine in a weight ratio of about (80 to 60):(20 to 40) and coupling the diazotized toluidine mixture onto N-p-anisidide-3-hydroxy-2-naphthamide of the formula

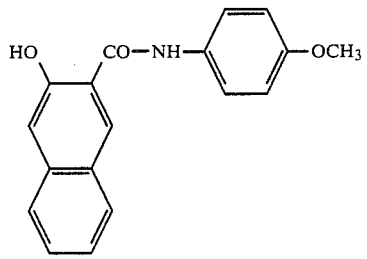

6. A process according to claim 5 wherein the p-toluidine and o-toluidine are in a weight ratio of about 70:30.

7. In an improved process for dyeing and printing hydrophobic fiber materials and mixtures thereof with natural fibers or regenerated cellulose fibers by dyeing and printing with an azo dyestuff-containing dyeing liquor or printing paste, the improvement comprises said dyeing liquor or printing paste containing a dyestuff mixture according to claim 1.

8. A process according to claim 7 wherein the material dyed or printed is a polyester-containing material.

* * * * *